Sept. 9, 1969     B. S. BURRUS     3,465,531

SUBSEA BRAKING SYSTEM

Filed May 2, 1968     3 Sheets-Sheet 1

INVENTOR.
BILL S. BURRUS

BY *Arthur L. Wade*

ATTORNEY

Sept. 9, 1969  B. S. BURRUS  3,465,531
SUBSEA BRAKING SYSTEM
Filed May 2, 1968  3 Sheets-Sheet 2

INVENTOR.
BILL S. BURRUS
BY
ATTORNEY

United States Patent Office 3,465,531
Patented Sept. 9, 1969

3,465,531
SUBSEA BRAKING SYSTEM
Bill S. Burrus, Tulsa, Okla., assignor to Combustion Engineering, Inc., New York, N.Y., a corporation of Delaware
Filed May 2, 1968, Ser. No. 726,120
Int. Cl. E02d 25/00; E21b 33/035, 43/01
U.S. Cl. 61—46                                    4 Claims

ABSTRACT OF THE DISCLOSURE

A package, or unitary assembly, of equipment required at the wellhead of a subsea oil well is guided between the subsea location and the surface by sliding contact with a line. A brake shoe on the package engages the guideline to regulate the transfer rate. The brake shoe is actuated by a mechanism responsive to a differential pressure generated by the changes in ambient pressure as the package changes vertical position between the subsea location and the surface.

BACKGROUND OF THE INVENTION

*Field of the invention.*—The present invention relates to the transfer of equipment in a subsea environment. More particularly, the invention relates to control of the rate of transfer of equipment in a subsea environment by means of frictional engagement between the equipment and a guideline between the surface and a subsea location.

*Description of the prior art.*—Extending one or more guidelines between a subsea location and the surface for guidance of equipment is known in the art of transporting equipment. Sliding engagement has been provided between the equipment and guidelines so the equipment may be seated at its subsea location with precision and conducted from this location to a predetermined surface position. The buoyancy of equipment has been changed to control the rate of ascent and descent of the equipment. Also, obviously, if the equipment has negative buoyancy, the guided equipment can be suspended from hoisting tackle which can be controlled to regulate the rate of movement.

SUMMARY OF THE INVENTION

A principal object of the invention is to apply friction between equipment and a subsea guideline to control subsea movement of the equipment.

Another object is to generate the friction from a differential pressure which is proportional to a predetermined change in the rate of vertical movement of the equipment.

Another object is to adjust the amount of friction generated by the differential pressure.

Another object is to develop friction on each guideline to maintain a predetermined attitude for the equipment as it moves vertically in its subsea environment.

The present invention contemplates a combination of a guideline and equipment moved from a subsea location to a surface position. The guideline and equipment are linked together to guide the equipment in its vertical subsea movement. A friction brake is mounted on the equipment and applied to the guideline. The brake is mechanically actuated by a differential pressure, the differential pressure being generated as the equipment is moved vertically. The ambient pressure, or hydrostatic head, is converted by a differential pressure-to-mechanical movement transducer in which this first pressure is arranged to oppose a second pressure which changes at a rate different than the rate of change in the first pressure. The resulting differential of pressures generates a friction on the guideline which becomes greater as the equipment moves faster along the vertical guideline. The friction retards movement of the equipment in regulation of its rate of movement.

Other objects, advantages and features of this invention will become apparent to one skilled in the art upon consideration of the written specification, appended claims, and attached drawings, wherein:

Figure 1:
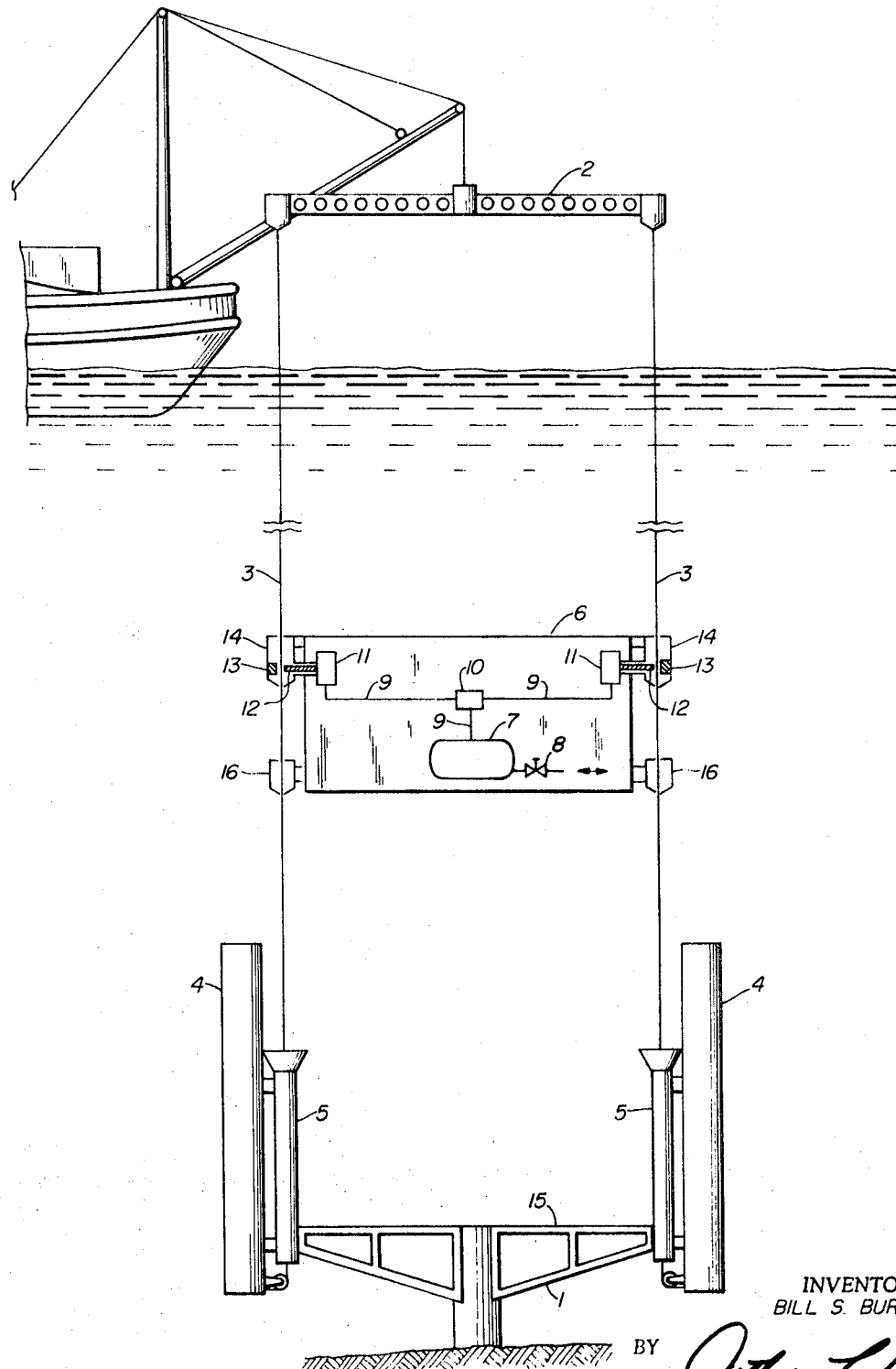
FIG. 1 is a sectioned schematic elevation diagram of a subsea platform, process package, and guiding-braking retrieval and emplacement system in which the braking system invention is embodied.
Figure 3:
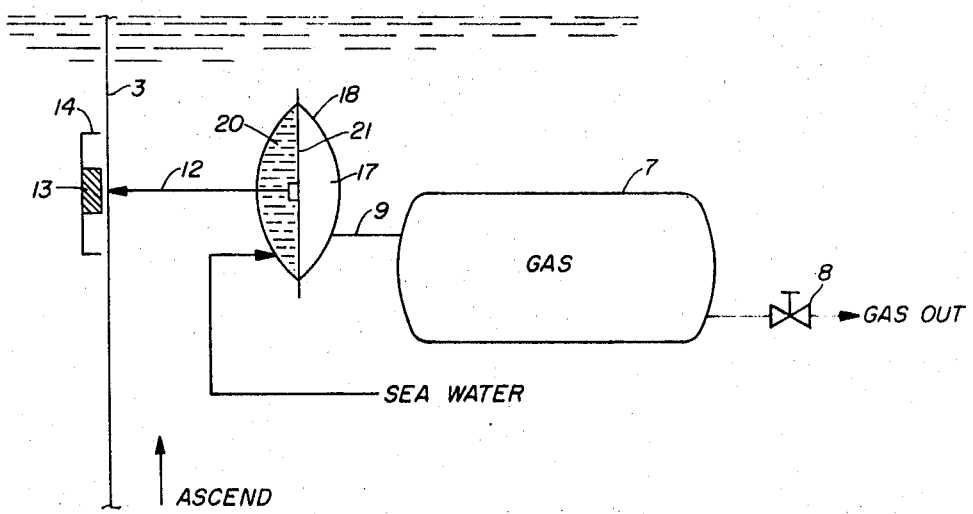
Figure 4:
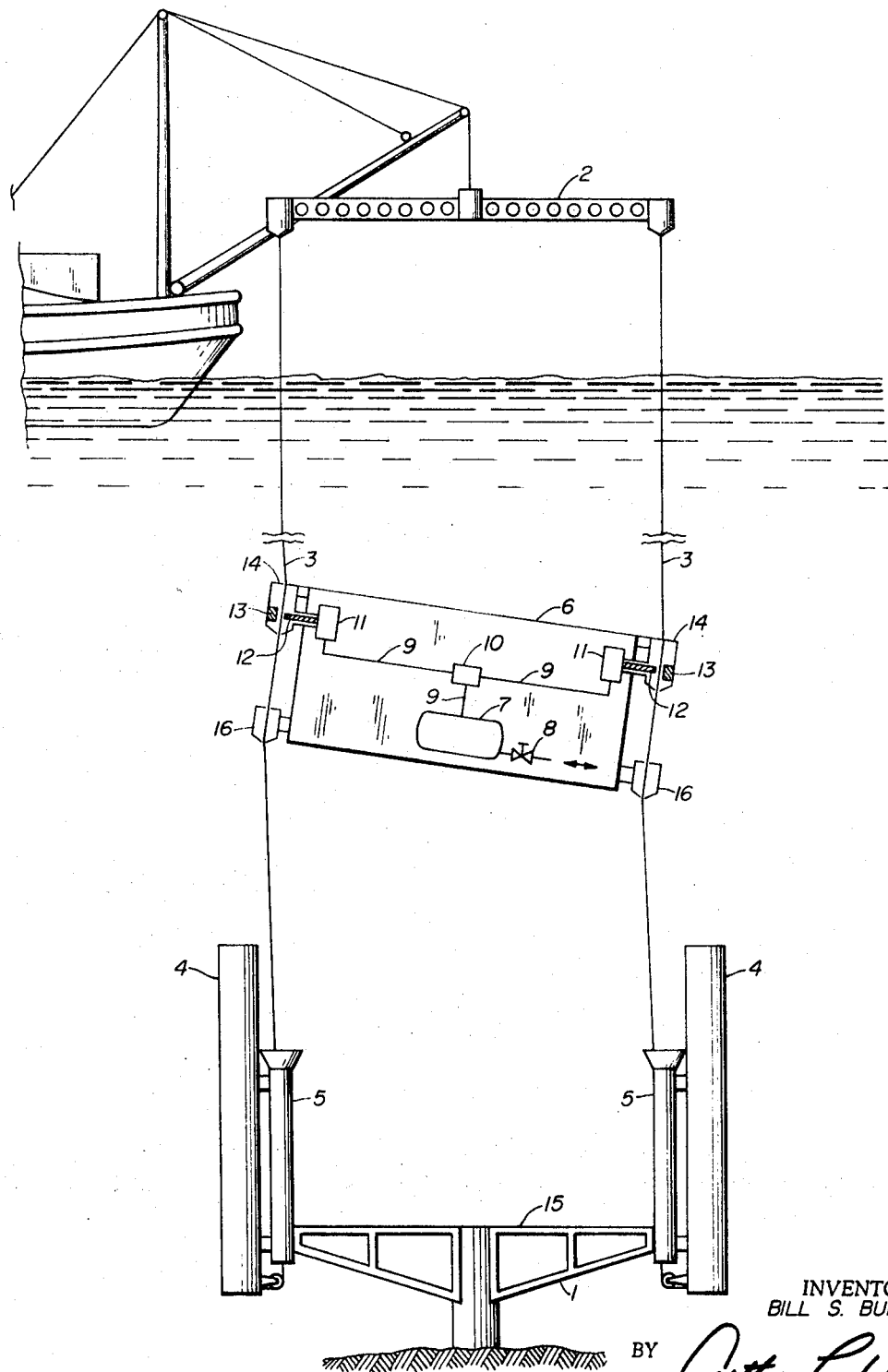

FIG. 3 is a sectioned schematic elevation of an arrangement of the actuating elements of the braking system in operation during ascent from a subsea location; and FIG. 4 is a sectioned schematic elevation diagram of a subsea platform, process package, and guiding-braking retrieval and emplacement system, similar to FIG. 1, in which the process package has deviated from the predetermined attitude and illustrating the operation of the braking system invention to return the package to the predetermined attitude.

DESCRIPTION OF THE PREFERRED EMBODIMENT

FIG. 1 discloses the invention in the more elaborate embodiment. An extensible-retractable structure is also disclosed which is similar to that forming the subject matter of my copending application S.N. 671,365, filed Sept. 28 1967. The extensible-retractable structure is mounted at subsea location 1. Prominent features are the head structure 2, guide and control lines 3, extending-retracting structures 4, and guides 5.

FIG. 1 discloses the subject invention embodied in the braking system for process package 6. Vessel 7 is depicted mounted within the package 6 and containing sufficent gas pressure to operate the braking mechanism on lines 3. A pressure regulator 8 at vessel 7 provides control of the pressure in the vessel.

Figure 2:
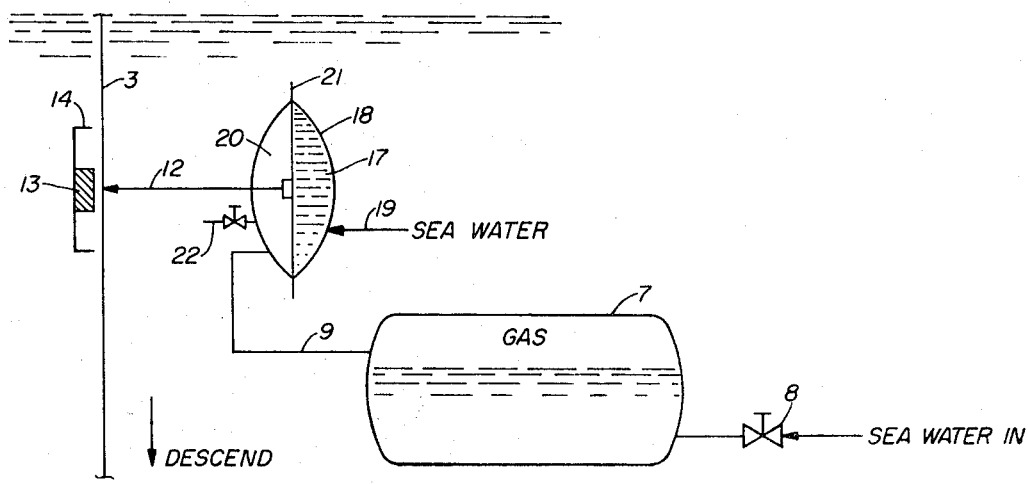
FIG. 2 is a sectioned schematic elevation of an arrangement of the actuating elements of the braking system in operation during descent to a subsea location.

Brake lines 9 connect vessel 7 to a switching means 10 and differential pressure operated structures 11. FIGS. 2 and 3 further disclose structures 11 as pressure regulated diaphragm valves in the preferred embodiment.

A braking pin or rod 12 and brake shoe contained in housing-guide 14 is shown connected to the structure 11. The arrangement embodies the concept of using the difference in pressure between vessel 7 and the ambient hydrostatic pressure to control the application of frictional force on lines 3 by the brake structures, and therefore the ascent and descent of equipment between a subsea location and the surface.

Process package 6 will be adaptable to contain a wide variety of equipment or stores necessary to support a subsea operation. One important use for such a unit will be to contain underwater oil field producing and field processing equipment.

The package 6 will be designed to rest on a support structure 15. The package will be oriented in place as line guides 14, 16 key into guides 5, and will be fastened to the support structure 15 by appropriate means not disclosed.

FIG. 2 depicts the operation of the invention during descent of the package 6. In the preferred embodiment, the "top" side 17 of pressure regulated diaphragm valve 18 is open to the ambient pressure of the sea water. This hydrostatic pressure is communicated to the diaphragm through a port 19. Vessel 7 transmits a counterpoise pressure through line 9 to the "back" side 20 of diaphragm 21.

As the package to which the braking system is attached descends, the ambient pressure applied through 19 to the top side 17 of diaphragm 21 increases. Without an increase of the counterpoise pressure at 20, diaphragm 21 would move braking pin 12 against brake shoe 13 to apply braking force to line 3. In normal descent, however, pressure regulator 8 is exposed to the ambient hydrostatic pressure, and has been adjusted to permit entry of sea water into vessel 7 at a predetermined rate.

This entry of sea water compresses the gas cap in vessel 7. The increasing pressure is transmitted to the back side 20 of diaphragm 21, maintaining the counterpoise pressure in a predetermined relation to the increasing ambient hydrostatic pressure, and either preventing or permitting the actuation of pin 12 onto shoe 13.

It becomes obvious that if it were desired to slow or stop the package during descent, the brake could be applied to line 3 by reducing the intake at 8, or by venting the pressure from side 20 of the diaphragm at port 22 by a valve or other control means.

It is apparent that the working fluid in opposition to the ambient hydrostatic pressure could be water as well as gas, depending on the line 9 and vessel 7 arrangement. It is also apparent that gas pressure from a high pressure source could be supplied to vessel 7, removing the use of sea water as the gas compressing agent during descent. It is only important to disclose the counterpoise as a differential and variable pressure applied from a source external to and connected to the diaphragm regulator 18.

FIG. 3 depicts the operation of the invention during ascent of the package 6. During ascent, the back side 20 of a diaphragm valve 18 is open to the ambient hydrostatic pressure through a port 23. Vessel 7 transmits a counterpoise pressure through line 9 to diaphragm 21.

As a package to which the braking system is attached ascends, ambient hydrostatic pressure decreases. Pressure regulator valve 8 bleeds gas from the pressure source at vessel 7 at a rate which will control the tendency of pin 12 to move onto brake shoe 13 and thus control the application of frictional force to line 3. The bleed rate at 8 controls the braking action and thereby the rate of ascent of package 6.

FIG. 4 depicts the subject invention embodied in the braking system for package 6. FIG. 4 is similar to FIG. 1 in that the elements of the system are the same and package 6 is intermediate between the surface and location 1. However, in FIG. 4 the package 6 has deviated from its desired horizontal attitude.

Brake lines 9 interconnect structures 11 so that each structure 11 is supplied by and responsive to the same single pressure source of vessel 7. When package 6 deviates from the predetermined attitude (shown in FIG. 1), the braking forces at structures 11 will not be equal. The subject invention will therefore operate to automatically return package 6 to its proper attitude.

This is understood by reference to FIGS. 2 and 3. For example, presuming the package of FIG. 4 is descending, the low right side structure 11 will be exposed to a greater ambient hydrostatic pressure than the high left side.

This higher subsea ambient at the low side of package 6 will cause a higher pressure in space 17 of FIG. 2 on this low side than on the high side. The counterpoise on the low side (in space 20 in FIG. 2) will not change, however. Thus, the low side brake will set, and apply a frictional force to line 3.

The high left side will then continue its descent until it returns the package 6 to the desired horizontal plane. Since the counterpoise on the right side brake has now increased, the brake will release. The package will then continue to descend in normal fashion.

The braking forces will be variably applied as necessary to cause package 6 to remain in the predetermined attitude. This variable braking is effected by hydrostatic pressures at structures 11 varying with respect to one another from the preset condition, thus causing unequal braking forces between the various brake structures which are applied in the direction necessary to level the package 6.

It is apparent that a person could accompany the ascent or descent of package 6, and manually regulate pressure controller 8 to obtain any desired ascent or descent rate. It is also apparent that the rate at which controller 8 allows gas out of or the influx of sea water into vessel 7 could be controlled by one of several surface controlled means.

It is also apparent that the ambient water pressure could be sensed on the back side 20 of the diaphragm during descent and the top side 17 during ascent. This would merely cause an opposite direction of movement of the pin 12 to engage a braking surface 13.

It likewise is apparent that a variety of braking structures could be substituted for pin 12 and shoe 13, such as springs, clamps, gears, clutches, discs, and so forth.

It is further apparent that regulating valve 8 could be placed between a relatively high pressure vessel 7 containing gas only and a diaphragm regulator 18.

The counterpoise would then be directly applied to and relieved from the appropriate side of diaphragm 21 by manual or other means.

The invention disclosed clearly shows the actuation of some braking structure by use of a differential pressure existing between the ambient hydrostatic pressure and a second separate source of pressure.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed withiut reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for controlling the vertical travel of a body in water, including,
    a guideline extending between the surface and a subsea location,
    a body coupled in sliding engagement with the guideline, whereby the body is guided between the surface and the subsea location,
    a friction brake structure between the body and guideline arranged for mechanical actuation,
    means for generating mechanical actuation connected to the brake and responsive to differential pressure,
    and means for generating differential pressure connected to the mechanical actuation means, the differential pressure developed by the ambient pressure of the water between the subsea location and the surface and a vapor pressure adjusted to change at a predetermined rate relative the ambient water pressure.

2. The system of claim 1, wherein,
    the friction brake includes a piston arranged to apply pressure to the guideline,
    and the means responsive to differential pressure is a diaphragm operator connected to the piston.

3. The system of claim 2, wherein,
    the means for generating differential pressure for the diaphragm includes a first connection to one side of the diaphragm applying the ambient pressure of water between the subsea location and the surface and includes a second connection to the other side of the diaphragm applying a gas pressure regulated by connection with the ambient water pressure through an adjustable valve.

4. A brake for equipment transferred between a subsea location and the surface, including,
  a line arranged between a subsea location and the surface and coupled in sliding contact with equipment transferred between the subsea location and the surface,
  equipment arranged to be mounted at the subsea location and coupled to the line with sliding contact,
  a brake shoe mounted on the equipment and arranged to engage the line in frictional contact so as to resist transfer of the equipment by sliding contact with the line,
  a diaphragm operator connected to actuate the brake shoe,
  a first connection between one side of the diaphragm and the ambient pressure of the equipment,
  a second connection between the other side of the diaphragm and a pressure which changes in relation to the ambient pressure at a predetermined rate,
  whereby the difference between the pressures of the first and second connections regulates the resistance provided to movement of the equipment between the subsea location and the surface.

References Cited
UNITED STATES PATENTS 3,173,271   3/1965   Wittgenstein _____ 61—72.1
3,236,302   2/1966   Postlewaite _____ 175—7 X JACOB SHAPIRO, Primary Examiner U.S. Cl. X.R.
61—69, 72.3; 166—.6; 175—7